(12) United States Patent
Wetsch

(10) Patent No.: US 11,999,515 B2
(45) Date of Patent: Jun. 4, 2024

(54) AUTOMATED FURNITURE BAGGER AND MATERIAL THEREFOR

(71) Applicant: Pregis Innovative Packaging LLC, Deerfield, IL (US)

(72) Inventor: Thomas D. Wetsch, Naples, FL (US)

(73) Assignee: Pregis Innovative Packaging LLC, Bannockburn, IL (US)

( * ) Notice: Subject to any disclaimer, the term of this patent is extended or adjusted under 35 U.S.C. 154(b) by 10 days.

(21) Appl. No.: 17/688,737

(22) Filed: Mar. 7, 2022

(65) Prior Publication Data

US 2022/0185516 A1 Jun. 16, 2022

Related U.S. Application Data

(63) Continuation of application No. 15/801,153, filed on Nov. 1, 2017, now Pat. No. 11,267,595.
(Continued)

(51) Int. Cl.
| | |
|---|---|
| *B65B 11/50* | (2006.01) |
| *B32B 3/02* | (2006.01) |
| *B32B 5/18* | (2006.01) |
| *B32B 27/06* | (2006.01) |
| *B32B 27/32* | (2006.01) |
| *B65B 9/02* | (2006.01) |

(Continued)

(52) U.S. Cl.
CPC ............ *B65B 11/50* (2013.01); *B32B 3/02* (2013.01); *B32B 5/18* (2013.01); *B32B 27/065* (2013.01); *B32B 27/32* (2013.01); *B65B 9/026* (2013.01); *B65B 25/00* (2013.01); *B65B 35/24* (2013.01); *B65B 35/243* (2013.01); *B65B 41/12* (2013.01); *B65B 51/16* (2013.01); *B65B 51/26* (2013.01); *B32B 2266/025* (2013.01); *B32B 2439/00* (2013.01); *B65B 41/16* (2013.01)

(58) Field of Classification Search
CPC ..... B29C 64/118; B29C 64/106; B32B 13/12; B32B 27/306; B32B 2307/202; B32B 2315/06; B33Y 10/00; B33Y 30/00; B33Y 70/10; B33Y 80/00; B33Y 70/00; E21B 47/005; E21B 2200/01; B29K 2029/04; B29K 2105/0079; C04B 7/02; C04B 26/02; C04B 41/009; C04B 41/48; C04B 2111/00181; C04B 2111/00612; B28B 7/342; B28B 1/001; B28B 7/346; B28B 7/348; B28B 23/02; B29L 2031/757; C09K 8/42
See application file for complete search history.

(56) References Cited

U.S. PATENT DOCUMENTS

| | | |
|---|---|---|
| 3,552,088 A | 1/1971 | Niwa |
| 3,672,116 A | 6/1972 | Ingmarson |

(Continued)

*Primary Examiner* — Brian Handville
(74) *Attorney, Agent, or Firm* — Fox Rothschild LLP

(57) ABSTRACT

Provided herein is a furniture wrapping system. The furniture wrapping system includes a film roll support configured to unroll a first film across a path of the furniture article in a first direction, such that the film roll support positions a film barrier across the path. The furniture wrapping system includes a conveyor mechanism configured to carry the furniture article along the path and into the barrier. The furniture wrapping system includes a sealer configured to extend across the path to form a seal such that the furniture article is partially enclosed in the first film.

23 Claims, 10 Drawing Sheets

Related U.S. Application Data

(60) Provisional application No. 62/415,956, filed on Nov. 1, 2016.

(51) Int. Cl.
  *B65B 25/00* (2006.01)
  *B65B 35/24* (2006.01)
  *B65B 41/12* (2006.01)
  *B65B 51/16* (2006.01)
  *B65B 51/26* (2006.01)
  *B65B 41/16* (2006.01)

(56) References Cited

U.S. PATENT DOCUMENTS

| | | | |
|---|---|---|---|
| 3,686,820 A | 8/1972 | Zenger et al. | |
| 3,815,313 A | 6/1974 | Heisler | |
| 3,927,507 A | 12/1975 | Reid | |
| 3,994,116 A | 11/1976 | McCormick | |
| RE29,362 E | 8/1977 | Reid | |
| 4,313,288 A | 2/1982 | Tassi et al. | |
| 4,319,443 A | 3/1982 | Watts, Jr. | |
| 4,413,463 A | 11/1983 | Lancaster | |
| 4,563,859 A | 1/1986 | Visser | |
| 4,761,937 A | 8/1988 | Francioni | |
| 4,774,800 A | 10/1988 | D'Angelo | |
| 4,831,812 A | 5/1989 | Martin Cocher et al. | |
| 5,357,731 A | 10/1994 | Conway et al. | |
| 5,412,925 A | 5/1995 | Tani et al. | |
| 5,882,573 A | 3/1999 | Kwok et al. | |
| 5,902,540 A | 5/1999 | Kwok | |
| 5,904,298 A | 5/1999 | Kwok et al. | |
| 6,427,422 B2 | 8/2002 | Nakagawa et al. | |
| 6,534,137 B1 * | 3/2003 | Vadhar | B32B 27/08 428/474.9 |
| 6,796,103 B2 | 9/2004 | Gamberini | |
| 7,383,676 B1 | 6/2008 | Schmidt et al. | |
| 7,389,630 B2 | 6/2008 | Nakano | |
| 2004/0093836 A1 | 5/2004 | Ouellette et al. | |
| 2004/0255557 A1 | 12/2004 | Shanklin et al. | |
| 2005/0120682 A1 | 6/2005 | Cullen | |
| 2005/0262812 A1 | 12/2005 | Thorpe | |
| 2008/0229715 A1 | 9/2008 | Schmidt et al. | |
| 2012/0096814 A1 | 4/2012 | Hannen | |
| 2012/0205272 A1 | 8/2012 | Heilman et al. | |
| 2013/0047560 A1 | 2/2013 | Wetsch et al. | |
| 2013/0067858 A1 | 3/2013 | Spears et al. | |
| 2017/0120666 A1 | 5/2017 | Young et al. | |
| 2019/0071199 A1 | 3/2019 | Cassoli et al. | |
| 2019/0092507 A1 | 3/2019 | Price et al. | |

* cited by examiner

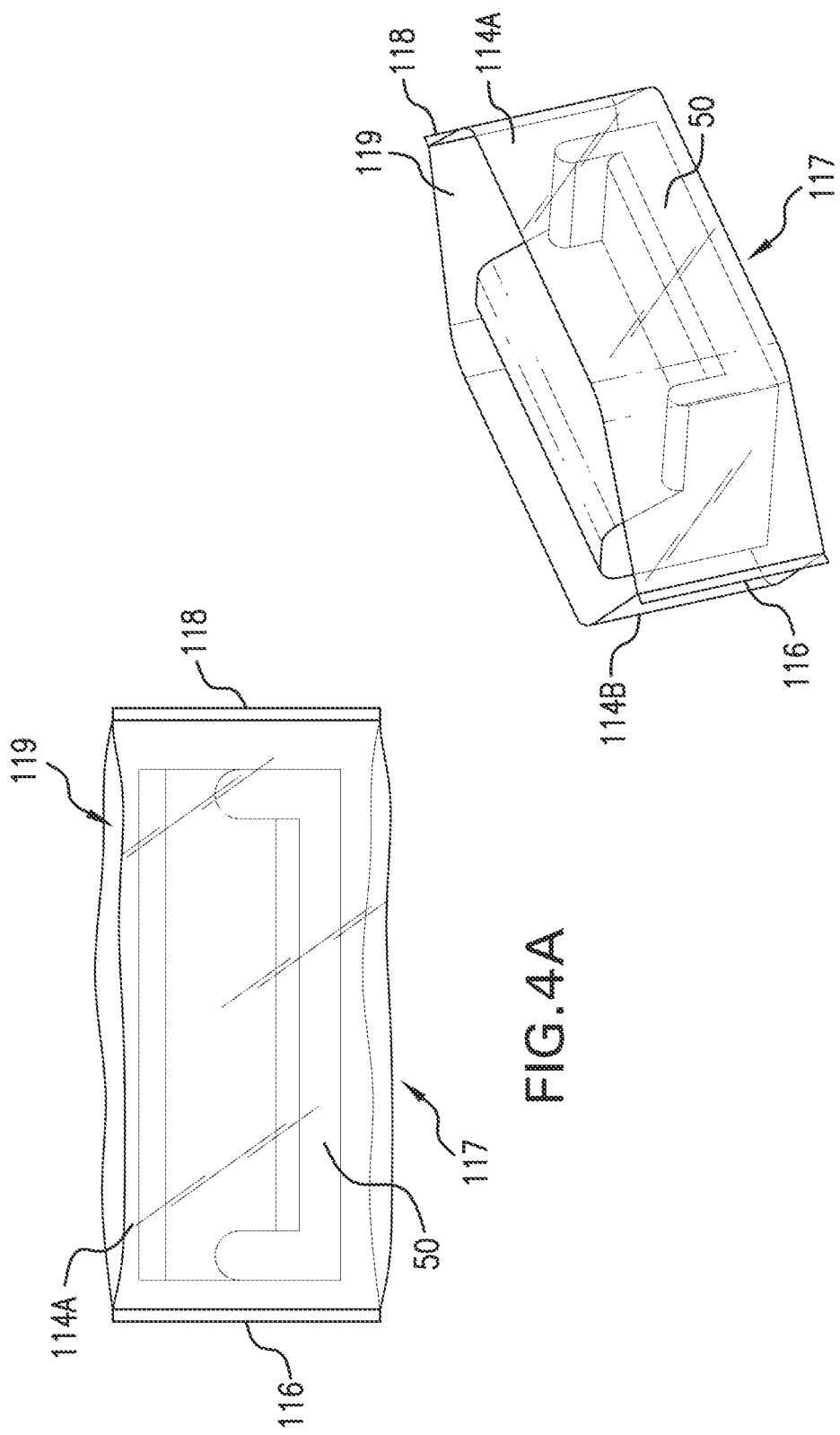

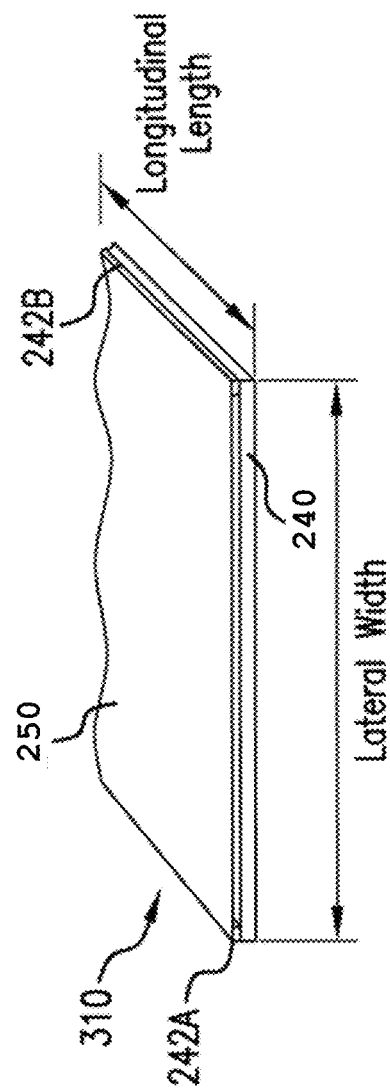
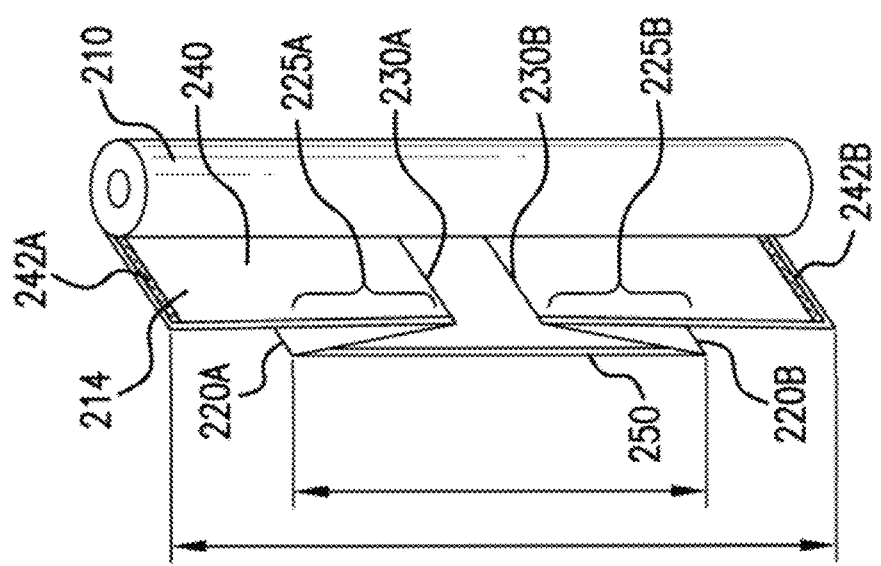

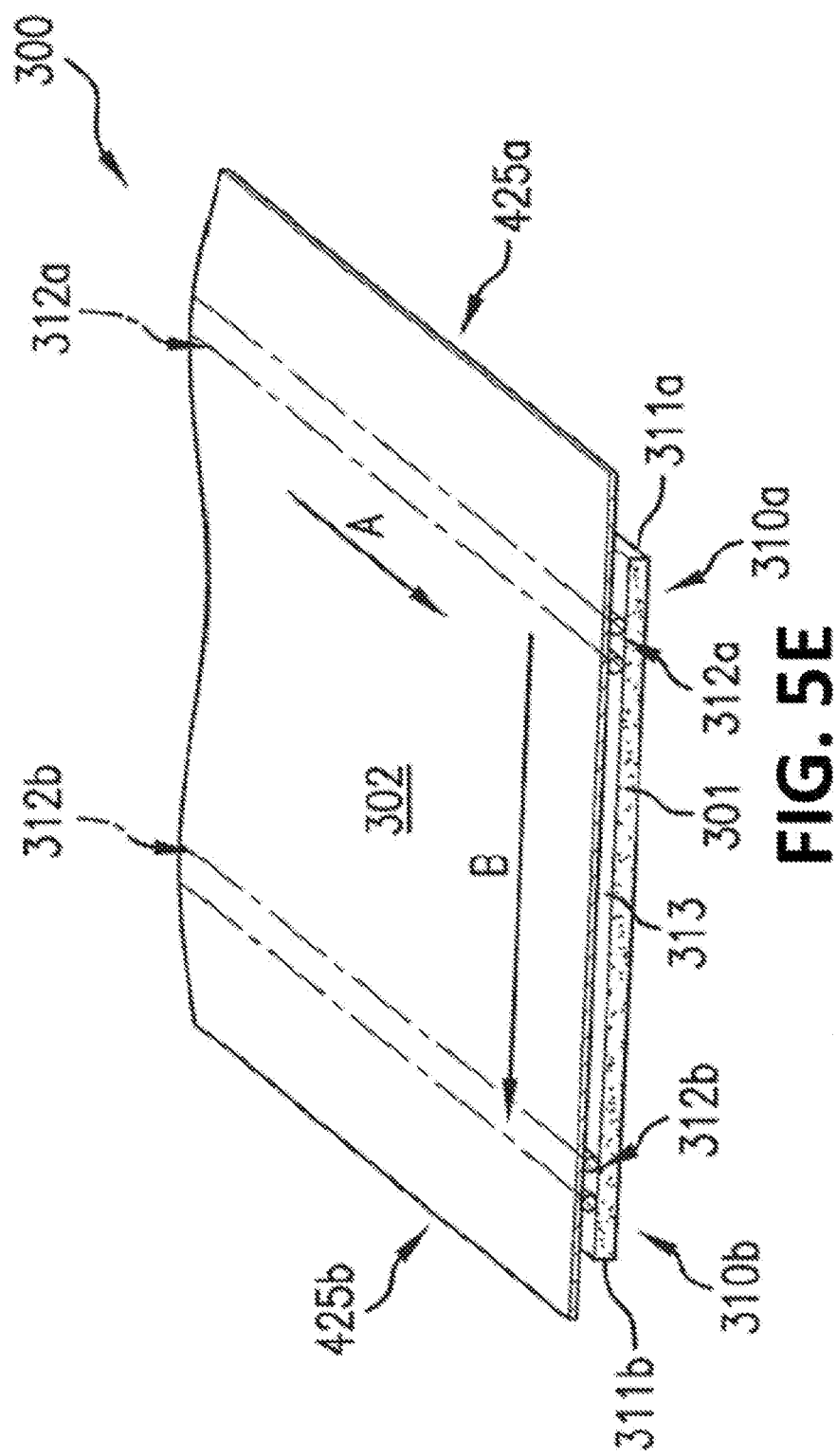

AUTOMATED FURNITURE BAGGER AND MATERIAL THEREFOR

CROSS REFERENCE TO RELATED MATTERS

This Application is a continuation of U.S. patent application Ser. No. 15/801,153, filed Nov. 1, 2017, which claims priority to U.S. Provisional Patent Application No. 62/415,956, filed on Nov. 1, 2016, which are herein incorporated by reference in their entirety.

BACKGROUND

Traditionally, furniture is wrapped by hand and manually packaged or bagged to protect it during shipping and handling. Such wrapping requires manipulating the furniture, sizing the bags or material to fit around the furniture piece and then choosing the right wrapping material, all which can be difficult, time consuming, and sometimes dangerous to individuals tasked with manipulating the furniture or moving it around to get it wrapped and packaged. There are opportunities to improve the packaging used as well as the type of material and combine that with reduction in labor over traditional techniques.

SUMMARY

In accordance with various embodiments, a furniture wrapping system includes a first roll of film configured to unroll a first film across a path of the furniture article in a first direction. The first film may be supported across the path by upright supports. The furniture wrapping system may also include a second roll of film configured to unroll a second film to cross the path of the furniture article in a second direction through the wrapping frame. The first film and the second film form a film barrier across the path. The furniture wrapping system may also include a sealer configured to extend across the path to seal the first film to the second film around the furniture article.

In accordance with various embodiments, the first film and the second film may be sealed to one another, forming a barrier across the path. The sealer may be coupled to a frame that extends across the path, leaving an opening for the furniture article to pass through. The sealer may be a heat sealer configured to weld portions of the first and second films together.

In accordance with various embodiments, the furniture wrapping system may further comprise a guide that engages the first and second films to guide the first and second films to direct them perpendicular to the path, forming the barrier across the path. The furniture wrapping system may further comprise a third roll proximate the first roll. The third roll may dispense a third film extending therefrom at an angle approximately the same as the first film extends from the first roll such that as the first film from the first roll is depleted, the third film from the third roll is configured to be fed at approximately the same angle as the first film. The film may include a first plastic layer of film and a second layer of a protective foam attached to one another. The film roll may include a film stock that is gusseted and rolled onto the film roll.

In accordance with various embodiments, the sealer may be an end sealer configured to seal the first film to the second film at the leading and trailing ends of the furniture article. The sealer may be a longitudinal sealer configured to seal the first film to the second film along a longitudinal length of the furniture article. The path may be defined by a conveyor mechanism configured to carry the furniture article along the path and into the barrier. The longitudinal sealer may include an upper and lower longitudinal sealer configured to form seals on top of and underneath the furniture article. The conveyor mechanism may include a split conveyor having a first conveyor and a second conveyor with a gap there between. The gap may be positioned to receive the first film layer and the second film layer to form a lower longitudinal seal under the furniture article.

In accordance with various embodiments, a roll of furniture wrapping material may include a roll of sheet material having a layer of plastic and a layer of foam overlaid with the plastic layer. The roll may include a gusset formed by a first longitudinal fold, and a second longitudinal fold parallel to the first longitudinal fold but folded in the opposite direction as the first longitudinal fold. The first fold and the second fold may wrap circumferentially around the roll of sheet material. The roll of sheet material may further include a third longitudinal fold parallel to the first and second longitudinal folds and a fourth longitudinal fold parallel to the third longitudinal fold but folded in the opposite direction as the third longitudinal fold, forming a second gusset there between.

In accordance with various embodiments, a furniture wrapping system may include a first roll of film configured to unroll a first film across a path of the furniture article in a first direction. The first film may form at least a portion of a film barrier across the path. The roll may include a gusset formed by a first longitudinal fold, and a second longitudinal fold parallel to the first longitudinal fold but folded in the opposite direction as the first longitudinal fold. The first fold and the second fold may wrap circumferentially around the roll of sheet material. The furniture wrapping system may include a sealer configured to extend across the path to seal the first film to the second film around the furniture article.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 4A is a front schematic view of a wrapped furniture article in accordance with various embodiments of the present disclosure;

FIG. 4B is a side isometric schematic view of a wrapped furniture article in accordance with various embodiments of the present disclosure;

FIG. 5A is a side isometric schematic view of a gusseted roll of wrapping material in accordance with various embodiments of the present disclosure;

FIG. 5B is an isometric schematic view of a flattened portion of wrapping material in accordance with various embodiments of the present disclosure;

FIG. 5E depicts example perspective views of another example embodiment of a foam-film composite in accordance with the present disclosure;

DETAILED DESCRIPTION

Figure 1A:
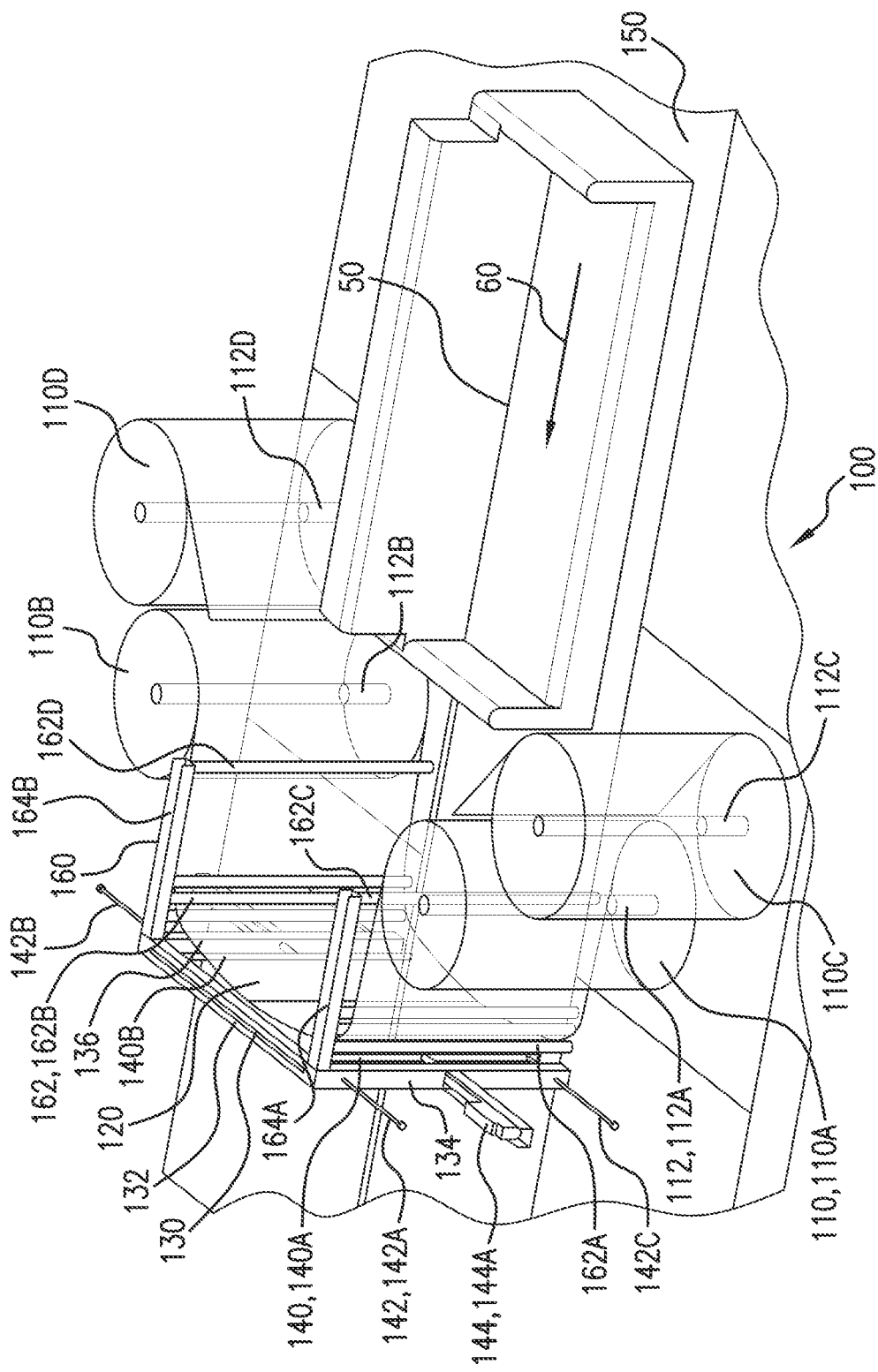
FIG. 1A is a front isometric schematic view of a furniture wrapping system in accordance with various embodiments of the present disclosure.

This disclosure is drawn, inter alia, to methods, systems, products, devices, and/or apparatus generally related to furniture wrapping and/or bagging systems. FIG. 1 is a front isometric schematic view of a furniture wrapping system 100 in accordance with various embodiments of the present disclosure. In accordance with such embodiments, the furniture wrapping system 100 includes a film supply 110 with a portion of film extending therefrom forming a barrier 120. Additionally, in various embodiments, the furniture wrapping system includes one or more of a support structure 130 (which supports the barrier 120), a sealing mechanism 140, a conveyor mechanism 150, and/or a guide structure 160.

Figure 1B:
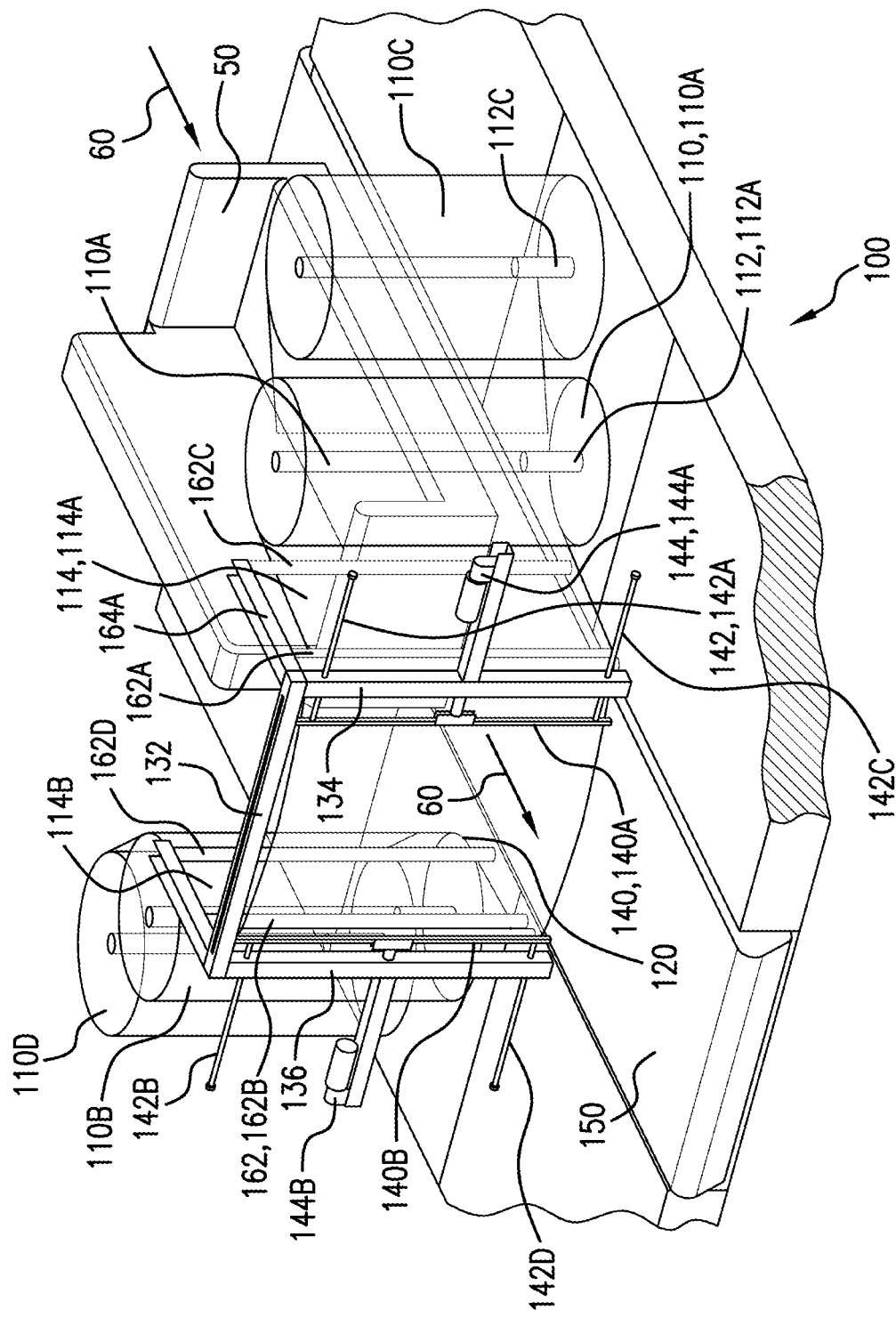
FIG. 1B is a rear isometric schematic view of a furniture wrapping system in accordance with various embodiments of the present disclosure.
Figure 2C:
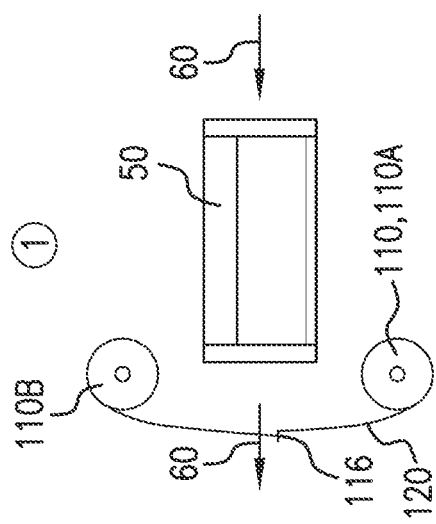
FIG. 2C is a top schematic view of a furniture wrapping system with a furniture article in a sealing position with the film extending the length of the furniture article in accordance with various embodiments of the present disclosure.
Figure 2B:
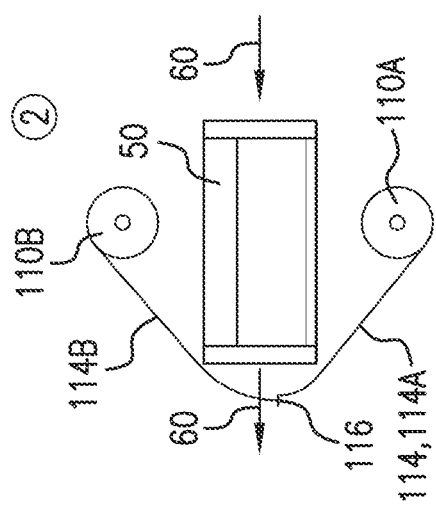
FIG. 2B is a top schematic view of a furniture wrapping system with a furniture article in a mid-wrapping position in accordance with various embodiments of the present disclosure.
Figure 2A:
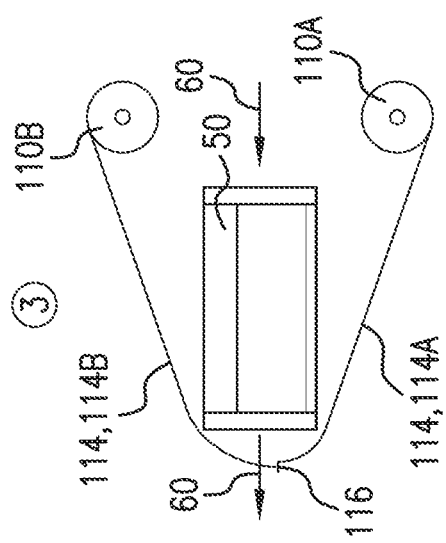
FIG. 2A is a top schematic view of a furniture wrapping system with a furniture article in an entry position in accordance with various embodiments of the present disclosure.

In one example, as shown in FIGS. 1A and 1B, the furniture wrapping system 100 is configured to wrap furniture article 50. Accordingly, the furniture wrapping system 100 includes the film supply 110, the support structure 130, and the sealing mechanism 140. A portion of film extends from the film supply 110 around the support structure 130 to form a barrier 120. The barrier 120 crosses the path 60 of the furniture article 50 such that as the furniture article 50 moves into the barrier 120, the portion of the film defining barrier 120 begins to wrap around the furniture article 50. In various embodiments, the furniture article 50 is moved along its path 60 by the conveyor mechanism 150. As such, the barrier 120 and the conveyor mechanism 150 intersect one another. The film supply 110 is configured to feed film toward the support structure 130 as the furniture article 50 moves along the path 60, thereby extending the film along the path 60 and the sides of the furniture article. FIG. 2A shows the furniture wrapping system 100 with the furniture article 50 in an entry position with respect to barrier 120; FIG. 2B shows the furniture article 50 in a mid-wrapping position; and FIG. 2C shows the furniture article 50 in a sealing position with the film extending the length of the furniture article. With film 114 extending the length of the furniture article 50, the sealing mechanism 140 is configured to seal the film, forming a trailing seal 118 (see FIG. 3) on the first furniture article 50, a leading seal 116, and a new barrier 120 suitable to intersect the travel path 60 of the next furniture article. In one example, the sealing mechanism 140 seals the film 114A extending along one side of the furniture article to the film 114B extending along the other side of the furniture article. In some embodiments, the sealing mechanism additionally or alternatively severs the film.

In accordance with various embodiments, the support structure 130 supports the film 114 across the path 60 of the furniture article 50 in a shape that provides coverage of the film along the height and length of the furniture article. The support structure 130 is sufficiently rigid to support the film 114 as it is supplied to the system and to withstand the drag of the film being withdrawn from supply 110 as the furniture article pulls the film 114 along the path 60. The support structure 130 may also be positioned across the furniture path 60 such that as it supports the film 114, the film and the support structure 130 define the barrier 120 across the furniture path 60. In accordance with various embodiments, the support structure 130 also provides a framework to support one or more of the sealing mechanism 140 components. For example, the support structure 130 includes upright supports 134 and/or 136. In one example, the upright supports 134, 136 are opposing vertical frames on which the sealing mechanism 140 can be mounted. The support structure 130 can also include one or more cross supports 132. The cross support 132 can be a horizontal frame member that provides lateral stability between the vertical supports 134, 138. In various embodiments, the cross support 132 is additionally or alternatively a track or guide support for the sealing mechanism 140 to provide support to the sealing mechanism as it traverses the path 60.

As discussed above, the sealing mechanism 140 is configured to seal the film before and/or after wrapping a particular furniture article 50. In accordance with various embodiments, the sealing mechanism 140 can include at least one sealer (e.g. 140A) configured to close off the film 114 around the furniture article 50. In various embodiments, the sealers seal the film along the height of the furniture article 50 referred to herein as end sealers (e.g. sealer 140A and/or 140B). In other embodiments, the sealers seal the film along the width of the furniture article 50. (e.g. the sealer may be positioned above and/or below the path) In other embodiments, the sealers seal the film along both the height and width of the furniture article 50. In other embodiments, the sealers seal the film along the length of the furniture article 50 (e.g. sealers 145A, 145B, 147A, and/or 147B shown in FIGS. 6A-6B) referred to herein as longitudinal sealers. In other embodiments, the sealing mechanism 140 may include both end sealers (e.g. 140A, 140B) and longitudinal sealers (145A, 145B, 147A, and/or 147B shown in FIGS. 6A-6B and discussed in more detail below). It may be appreciated that the seals can conform to sealing mechanisms known in the art including those that use adhesive to form the seal, those that use heat (thereby welding the films together) to form the seal, and/or those that use mechanical fasteners (e.g. staples, hook and loop, sewing seams, etc.) to form the seal. As illustrated by way of example in FIGS. 1A, 1B, 6A, and 6B, the seals are formed by way of a heat seal.

In accordance with various embodiments, the sealing mechanism 140 may include one or more end sealing members (e.g. 140A or 140B). The one or more end sealing members can include at least one heating element (e.g. 140A). In such an example, the heating element is configured to contact with an opposing member (e.g. 140B), which may be another heating element or a sealing plate on which the heating element (e.g. 140A) can compress the film 114 to heat the material to form a seal (e.g. 116 or 118) along the end of the furniture article 50. Either one or both of the end sealing members 140A or 140B can be movable to extend at least partially across the path 60 of the film 114. In a preferred embodiment, the end sealing members 140A and 140B are both movable and configured to extend out into the path 60 and then back into a retracted position. In this way, the sealing members 140A and 140B are able to compress opposing walls of the film (e.g. walls 114A and 114B) together to form the seal (116 or 118) along the path 60 of the furniture article. In a more particular embodiment, the sealing members 140A and 140B extend such that they meet at approximately the midpoint along the traverse width of the path 60 of the furniture article 50 and/or the conveyor 150.

In order to extend into the path 60 of the furniture article 50, the sealing mechanism 140 may include an extension system having a guide 142 and a driver 144. In some embodiments, the frame 132 also provides a track to further guide the sealing member (e.g. 140A) into the path 60 of the furniture article 50. In embodiments in which opposing sealing members extend into the path 60, each of the sealing members 140A and 140B includes a guide (e.g. 142A and 142B). In preferred embodiments, each of the sealing members 140A and 140B includes an upper guide 142A and 142B, respectively, and a lower guide 142C and 142D, respectively. The upper and lower guides help stabilize the end sealing members by reducing their tendency to rotate. In the embodiments shown in FIGS. 1A and 1B, the upper guide 142A, 142B and the lower guide 142C, 142D are linear shafts that extend through linear bearings in the upright frame members 134 and 136, respectively. This allows the linear bearings to provide stability to the respective of the sealing members 140A and 140B, improving the stability of the sealing members 140A and 140B.

In embodiments in which opposing sealing members extend into the path 60, each of the sealing members 140A and 140B includes a driver 144A and 144B, respectively. The drivers include mechanisms suitable to apply an extension force on the respective sealing member to extend the member into the path 60 and a retractive force to retract the member out of the path 60 so that the furniture article can move along the path 60. The drive mechanism 144 can include hydraulics, screw drives, scissor mechanisms, levers, or the like that are suitable to extend the sealing member into the pathway. In some embodiments, the drive mechanism 144 may only apply a force in one direction with a counterweight, spring mechanism or the like, causing the opposing force to return the sealing member in the opposite direction. As discussed above, in various embodiments only one sealing member moves (e.g. member 140A). In such embodiments, only that sealing member includes a drive mechanism and/or guides.

In accordance with various embodiments, the path 60 of the furniture article 50 is defined by a conveyor mechanism 150. Such conveyor mechanism can include any mechanism suitable to move the furniture article through the system 100. For example, the conveyor mechanism is a conveyor belt, conveyor chains, a lower-friction surface with conveyor bars (that push the article 50 along the surface) or any other mechanism suitable to move the article 50 along the path 60. In various embodiments, the conveyor mechanism 150 is a conveyor belt of suitable size to support the furniture article 50.

As discussed above and in accordance with various embodiments, the furniture wrapping system can also include a guide structure 160. The guide structure includes one or more components suitable to direct the film 114 from the supply 110 to the support structure 130 to form the barrier 120. For example, the guide structure 160 includes one or more rollers (e.g. 162A) suitable to change the film direction 114 between the film supply 110 and the seal 116 forming the barrier 120. In one example, the roller may be positioned proximal to the support structure 120 such that the film 114 routes around the roller and across the path 60. In some embodiments, a plurality of film supplies direct different films into the furniture wrapping system 100. For example, a film supply 110A is positioned on one side of the path 60 while film supply 110B is positioned on the opposing side of the path 60. In such an embodiment, the opposing film supplies 110A and 110B direct their respective films 114A and 114B around opposing guides 162A and 162B. In other embodiments, other guides such as guides 162C and 162D also constrain the path of the films 114A and 114B as they come from the supply 110A and 110B, respectively. For example, guides 162C and 162D redirect the film from the respective film supplies such that the film travels substantially parallel with the path 60 and guides 162A and 162B redirect the respective films from their parallel orientation to a perpendicular orientation across the path 60 to form the seal 116 and the barrier 120. In various embodiments, the guides are supported by a guide frame 164. For example, guide frame 164A connects and supports guides 162A and 162C together. In some examples, guide frame 164A additionally or alternatively connects guide 162A to support frame 130. An opposing system may be used as well. For example, guide frame 164B connects and supports guides 162B and 162D together. In some examples, guide frame 164B additionally or alternatively connects guide 162B to support frame 130.

As discussed herein, the film supply 110 provides the source of film 114 to the furniture wrapping system 100. The film supply 110 can be any type of supply suitable to start the path of the film such that it can ultimately be routed to wrap a furniture article. For example, the film supply 110 can be rolls of film, fan-fold film, sheets of film, or like configurations. Preferably, the film supply provides a steady feed to the system 100. As illustrated in FIGS. 1A, 1B, 2A, 2B, 2C, 5A, 6A, and 6B, the film supply may be a roll of the film 114. In some embodiments, multiple rolls of the film can be used. As discussed above, rolls 110A and 110B can provide material from opposing sides of the path 60. Additionally, in some embodiments secondary rolls 110C and 110D are positioned proximal to rolls 110A and 110B, respectively. In this way, the secondary rolls can provide the supply as the respective proximal roll is depleted. For example, as roll 110A is depleted, the film from roll 110C can immediately be fed into the wrapping system 100, allowing roll 110A to be replaced while 110C is being used. Similar replacement configurations can also be used for rolls 110B and 110D. In some embodiments, secondary rolls 110C and 110D can store the same material and serve as backup rolls. In other embodiments, secondary rolls 110C and 110D can store a different material that is layered and applied with the material of rolls 110A and 110B.

In accordance with various embodiments, the rolls 110 can be loaded onto spindles 112 suitable to reduce friction, provide tension, or otherwise aid the system 100 in wrapping furniture articles 50 with the film 114. For example, rolls 110A, 110B, 110C, and 110D are mounted on respective spindles 112A, 112B, 112C, and 112D. As shown, the spindles can be positioned transversely to the movement of the furniture through the system. For example, the spindles can be positioned in a vertical orientation. In other examples, the spindles can positioned in a horizontal orientation (e.g. positioned above or below the furniture.) In yet other examples, the spindles can be positioned in the range of angles between horizontal and vertical.

Figure 3:
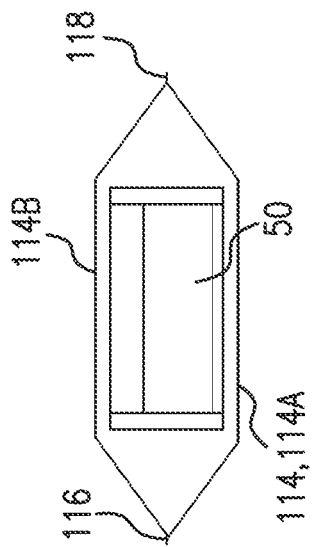
FIG. 3 is a top schematic view of a wrapped furniture article after being sealed in a furniture wrapping system in accordance with various embodiments of the present disclosure.

FIG. 3 is a top schematic view of the wrapped furniture article after being sealed in a furniture wrapping system 100 having end sealer 140. As shown, the ends are sealed at seals 116 and 118 but the top 119 and bottom 117 are open, forming a tube. FIGS. 4A and 4B are schematic illustrations of the wrapped furniture showing the end seals 116, 118 but having an open top 119 and bottom 117.

In some embodiments, flat sheets of film 114 may be rolled up to form rolled film supply 110. In other embodiments, sheets of film 214 having one or more folds are rolled up to form a film supply 210. Film supply 210 includes material that as it unrolls from the roll 210 can be expanded out to have a greater transverse width than the transverse width of the roll 210. In accordance with one embodiment, the sheet of film 214 may have at least one longitudinal fold. The fold in the various embodiments discussed here of film supply 210 folds each of the layers of the material. For example, in embodiments having both a plastic layer and a foam layer, both layers are folded. The fold may form a flap that extends the full transverse width of the roll 210 or the flap may extend less than the full transverse width of the roll such as ¾ of the roll, ½ of the roll, ¼ of the roll or other widths. In another embodiment, the sheets of film 214 may have a plurality of longitudinal folds. For example, the sheet may have two folds in the same direction, forming three substantially equal layers. Alternatively, one or more of the layers may be unequal in size to the others. In another embodiment, the sheet may be gusseted. As used herein, a gusset includes two folds in opposite directions from one another. Such gusseted folds may form a z-shape or zig-zag in the material. The sheet may have multiple gussets. For example, the sheet may have gussets that are identical to one another forming an expanded zig-zag pattern. In another example, the sheet may have gussets that are mirror images of one another as shown in FIG. 5A.

Figure 5C:
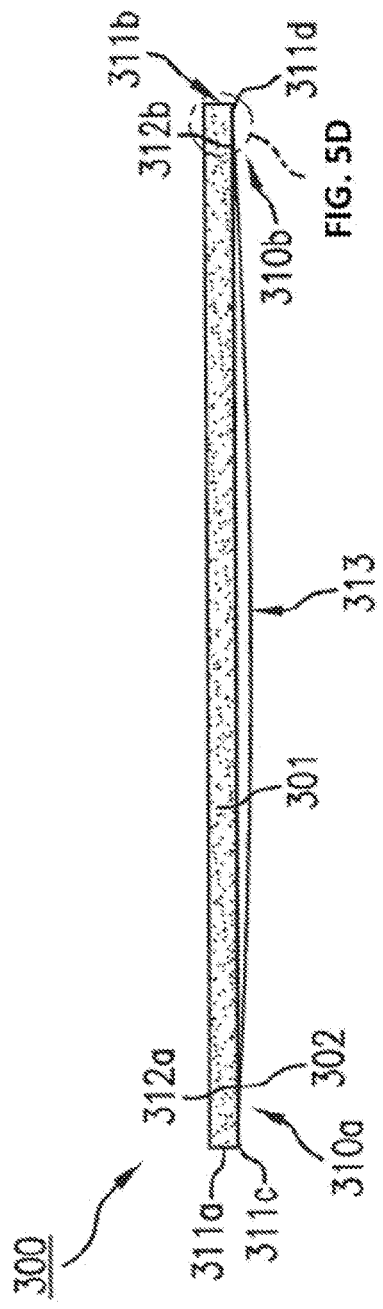
FIG. 5C-5D depict example cross-sectional views of a foam-film composite in accordance with the present disclosure.
Figure 6A:
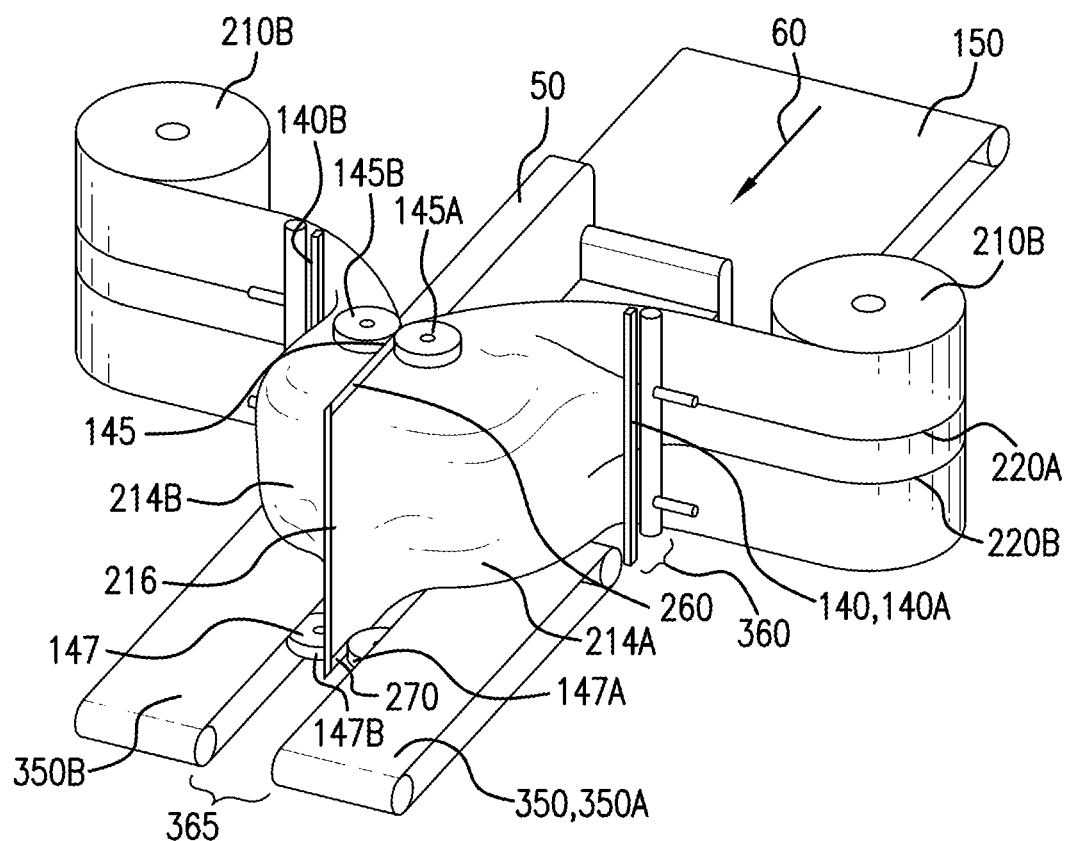
FIG. 6A is a rear isometric schematic view of a furniture wrapping system having upper and lower sealers in accordance with various embodiments of the present disclosure.

The gusseted sheets of film 214 may be rolled up to form rolled film supply 210 with the folds extending circumferentially around the roll of material. In embodiments having two or more mirror image gussets, the gussets can face inwardly when rolled as shown in FIG. 6A or outwardly when rolled as shown in FIG. 5A. Gusseted sheets allow the film supply 210 to have a minimal height while providing significantly more coverage area of the furniture article. For example, a gusseted sheet includes a first fold 220A and a parallel second fold 230A. The length of the gusset between the two folds doubled defines the added length that supplements the overall transverse width of the roll 210. Having a folded transverse width of X and a gusset width (e.g. 225A) of Y gives the roll at least a total unfolded transverse width of X plus 2Y. In a preferred embodiment, the roll 210 includes an upper gusset 225A defined by fold 230A and fold 220A and a lower gusset 225B defined by fold 230B and fold 220A, although embodiments having just one of these gussets is contemplated herein. In this embodiment, the unfolded transverse width of the material is the same as the folded transverse width of the material plus twice the width of gusset 225A and twice the width of gusset 225B. Such a configuration better enables a roll to wrap under a furniture article and over a furniture article without having to have a transverse width that is even as much as the furniture article. In some embodiments, the roll 210 rests on the same support surfaces or surfaces at substantially the same height as the furniture article. In this configuration the film can extend under the furniture article as the gusset is unfolded. In other embodiments, the film can rest at a lower level than the furniture article so that the height of the furniture article is centered on the film. As the gussets unfold the film supply expands along expanding folds show at reference 221.

In some embodiments, the furniture articles are wrapped with only a thin layer (e.g. about 0.05 mil to about 3.0 mil) of a polymer film. In other embodiments, the furniture articles may be wrapped with a foam or other protective layer first and then wrapped with the polymer film. In some embodiments, the polymer layer and the foam layer are attached to one another and applied at the same time, forming a wrapping material 310. The wrapping material may be rolled such as supply 110 or gusseted and rolled such as supply 210. For example, FIG. 5B illustrates a flattened portion of wrapping material 310. The film sheet 250 may generally be made of any polymer material. Preferably, the film sheet 250 is made of a polymer material including, but not limited to, polyethylenes, polypropylenes, polyvinyls, polyurethanes, and any other polymer as may be known in the art, including combinations and mixtures thereof. Most preferably, the film sheet 250 is made of a high density polyethylene (HDPE).

The foam sheet 240 may generally be made of any plastic material. Preferably, the foam sheet 240 is made of a polymer material including, but not limited to, polyethylenes, polypropylenes, polyvinyls, polyurethanes, and any other polymer as may be known in the art, including combinations and mixtures thereof. Most preferably, the foam sheet 240 is made of a low density polyethylene (LDPE). In general, the material from which the foam material is made is consistent throughout the sheet, although variations in composition are possible in some embodiments. The foam sheet 240 may be from approximately 1/16 inch to ½ inch thick. The film sheet 250 and the foam sheet 240 may be attached to one another with seals in any pattern and at any interval within the proximate areas including, but not limited to, one or more continuous strips, one or more intermittent (discontinuous) strips, one or more dashed patterns, one or more dotted patterns, beaded patterns, etc. Where adhesive is used, the applicator that applies the adhesive to the film and/or foam can apply a fiberized adhesive, such as in a spiral swirl or random fiber pattern, for example as described in U.S. Pat. Nos. 5,902,540; 5,882, 573; and 5,904,298. The seals may also be a plurality of adjacent seal lines disposed near the foam material edge(s). In a preferred embodiment, the foam 240 and film 250 are attached on opposing ends 242A and 242B. The width of the seals (or strips thereof) may generally be between about 0.05 inches and 1 inch, but may preferably be between about 0.1 inches and 0.5 inches, more preferably between about 0.2 inches and 0.3 inches. In an exemplary embodiment, the seals may preferably be about ¼ inch wide. Although the various seals provided in the composite may generally be consistent among themselves, in some embodiments there may be variations among the type of seals, the patterns of the seals, the width of the seals, or other aspects of the configurations of the seals. Such material may be further described in U.S. Patent Pub. No. 2013/0047560 entitled edge attached film foam sheet, which is hereby incorporated by reference in its entirety. In accordance with one embodiment, the film sheet 250 and foam sheet 240 are the same size. In another embodiment, the film sheet 250 is larger than the foam sheet 240. In another embodiment, the foam sheet 240 is larger than the film sheet 250.

Figure 5D:
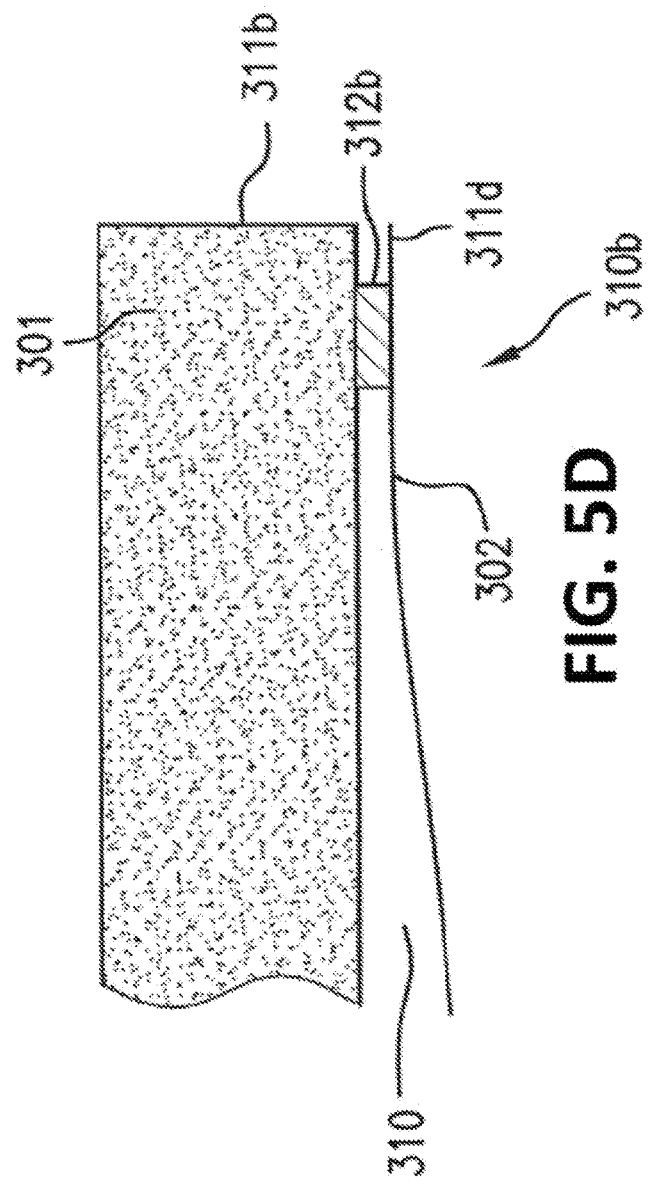

The present disclosure relates to novel and advantageous foam-film composites that may be configured as furniture covers, among other things, and apparatus and methods for making and using the same. In an embodiment, as depicted in FIGS. 5C-D, a foam-film composite 300 in accordance with the present disclosure may include a foam sheet 301 and a film sheet 302.

The foam sheet 301 may include one or more lateral edges, for example, a first lateral edge 311a and a second lateral edge 311b. Lateral edges may be provided opposite one another on the sheet, and also generally parallel to one another. The width of the foam sheet, i.e., the distance between lateral edges, may generally be between about 40 inches and 200 inches, but is preferably between about 70 inches and 115 inches, more preferably between about 100 and 110 inches. In an exemplary embodiment, the width of the foam sheet is about 106 inches.

The film sheet 302 may include one or more lateral edges, for example, a first lateral edge 311c and a second lateral edge 311d. Lateral edges may be provided opposite one another on the sheet 302, and also generally parallel to one another. The width of the film sheet, i.e., the distance between lateral edges, may generally be between about 50 inches and 150 inches, but is preferably between about 90 inches and 115 inches, more preferably between about 100 and 110 inches. In an exemplary embodiment, the width of the film sheet is about 106 inches.

In some embodiments, one or more seals may be provided between the film sheet 302 and the foam sheet 301. As shown in FIG. 5C, a first seal 312a between the film sheet 302 and the foam sheet 301 is provided in an sealed area 310a proximate to, but preferably not exactly at, the first lateral edge of the foam sheet 311a and the first lateral edge of the film sheet 311c. The first proximate area 310a may generally extend along the entire longitudinal length of the film and foam sheets, although in some embodiments it may extend only part way or intermittently therealong. As also shown in FIG. 5C, a second seal 312b between the film sheet 302 and the foam sheet 301 is provided in an area 310b proximate to, but not exactly at, the second lateral edge of the foam sheet 311b and the second lateral edge of the film sheet 311d. The second proximate area 310b may generally extend along the entire longitudinal length of the film and foam sheets, although in some embodiments it may extend only part way or intermittently therealong. FIG. 5D, in particular, provides a close-up view of the second seal 312b, the second proximate area 310b, the second lateral edges 311b and 311d (arrow Z indicating the area of FIG. 5C shown in FIG. 5D). The proximate areas 310a, 310b may generally be between about 0.1 inches and three inches from the lateral edges, but may preferably be between about 0.5 inches and 10 inches from the lateral edges, more preferably between about 0.75 inches and 7 inches. In an exemplary embodiment, the proximate areas are provided about 5 inches from the lateral edges. While two seals are shown in the figures, it will be appreciated that more of fewer seals may be provided consistent with the present disclosure. Further, the proximate areas wherein the seals are located may be provided at consistent distances from the lateral edges, or may vary in distance along the length of the composite. With respect to the width between the first and second edges of the foam and or film material, in some embodiments the first and second seals may be positioned within about 10% of the material width from the respective first and second lateral edges of the respective material, or within about 5%. Spacings of 1%, 15%, 20%, or any percentage thereinbetween are also examples in some embodiments.

An area of adjacency between the film sheet 302 and the foam sheet 301, that are between the seals 312a, 312b, as shown in FIG. 5C, for example, are indicated by reference numeral 310. This area 313, which may generally be referred to as an "unsealed" area, may be free of any seals, lamination, or other adhesive that would hold the film sheet 302 to the foam sheet 301. In this manner, the film sheet 302 and the foam sheet 301 may be free to separate, move, or slide relative to one another in the area 310. The film and foam may thus be substantially unsealed along the entire transverse width between the first and second sealed portions near the lateral edges of the foam material. The lateral width of the unsealed area, in some embodiments, may be above 95% of the lateral width of the foam and/or film materials, although in other embodiments, the it can be at least about 20%, 50%, or 75% thereof, for example. The lateral width of the unsealed portion compared to the lateral width of the sealed areas is preferably at least twice as wide, and more preferably at least 3 times, 5 times, or 10 times, or 20 times as wide. In an embodiment of a supply length of the composite sheet, typically provided as a roll, the sealed and unsealed areas extend continuously and preferably uninterruptedly along the entire longitudinal length of the supply material, although other embodiments may have longitudinal portions that are different, such are having a seal or perforation extending laterally thereacross.

FIG. 5E shows a perspective view of a further embodiment of a foam-film composite in accordance with the present disclosure. The embodiment shown herein may be the same in all material aspects as the foam-film composite described with regard to FIGS. 5C-5D above, except that the film layer may be wider than the foam layer, thereby creating one, two, or more overhang areas 425a, 425b at the lateral edges of the composite. The overhang areas 425a, 425b may generally be provided between about 0.5 inches and 10 inches in length, but are preferably between about 1 inch and 8 inches, more preferably between about 4 inches and 6 inches. In an exemplary embodiment, the overhang areas 425a, 425b may be about 5 inches.

For purposes of discussion, directional arrows A and B are provided to orient the reader, with arrow A pointing generally in a longitudinal direction and arrow B pointing generally in a transverse direction.

Figure 6B:
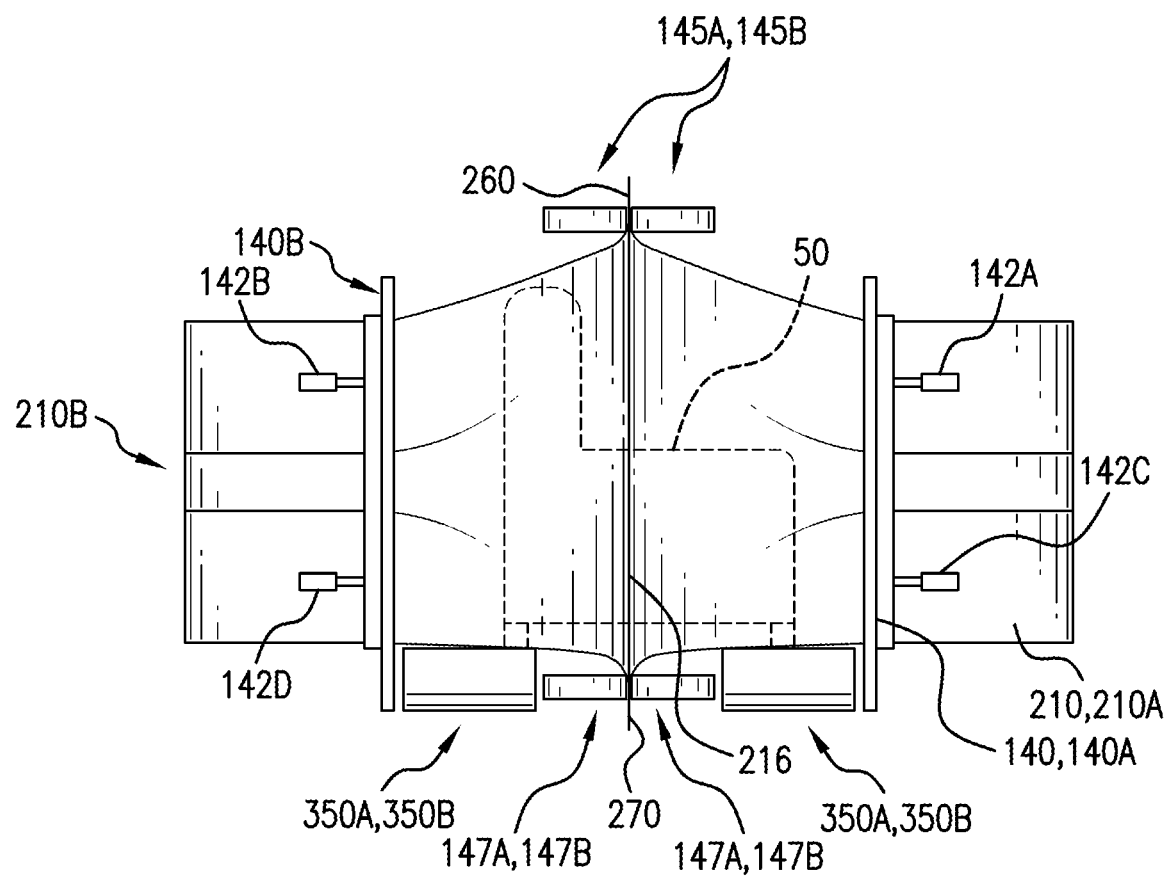
FIG. 6B is a rear schematic view of the furniture wrapping system of FIG. 6A having upper and lower sealers in accordance with various embodiments of the present disclosure.

As discussed above, the furniture wrapping system may also include longitudinal sealers, as illustrated in FIGS. 6A and 6B, suitable to form longitudinal seals along the length of the furniture article 50 in addition to or in an alternative to the end seals 116, 118 discussed above. In various embodiments, a longitudinal sealer may include a mechanism configured to apply a seal along the length of the film, e.g. 114 or 214, as the furniture article progresses through the system. In one example, the longitudinal sealer 145 may include a heating element 145A. The longitudinal sealer 145 may also include an opposing element 145B to provide pressure against the heating element to compress and seal the film. In some embodiments, both the element 145A and the opposing element 145B include heating elements to weld the opposing films 214A, 214B together, forming longitudinal seam 260. In various embodiments, the heating element 145A is on a rotating drum. In other embodiments, the heating element 145 is stationary with the film sliding between the heating element 145A and the opposing member 145B. In various embodiments, the system 100 may include upper longitudinal sealer 145 and lower longitudinal sealing 147. The lower longitudinal sealer 147 may include a heating element 147A. The longitudinal sealer 147 may also include an opposing element 147B to provide pressure against the heating element to compress and seal the film. In some embodiments, both the element 147A and the opposing element 147B include heating elements to weld the opposing films 214A, 214B together, forming longitudinal seam 270. In various embodiments, the heating element 147A is on a rotating drum. In other embodiments, the heating element 147A is stationary with the film sliding between the heating element 147A and the opposing member 147B. The upper longitudinal sealer may be positioned above the furniture article and the lower longitudinal sealer may be positioned below the furniture article. In other embodiments, the longitudinal sealer[s] move along the length of the furniture article, applying the seal to the film.

In embodiments having a lower longitudinal sealer 147, the conveyor mechanism may include a gap 360 suitable to extend the film 214 under the furniture article 50 without having to lift the furniture article to do so. For example, gap 360 may be located between two conveyor portions e.g. 150 and 350. The film 214A, 214B can extend through this gap and under the furniture article. In accordance with various embodiments, the second conveyor portion 350 has a gap 365 suitable to provide clearance with the lower sealer 147 such that the sealer 147 can apply a longitudinal seal 270 under the furniture article without interfering with the conveyer mechanism. For example, the second conveyor portion 350 includes a split conveyor having conveyors 350A and 350B with a gap 365 there between. The gap may be sufficiently sized to operate the lower sealer 147 therein or below the gap 365. In this embodiment, the roller 210 with gusseted film aids in extending a length of film below the furniture article when the film is otherwise at approximately the same plane as the conveyor mechanism.

Figure 7:
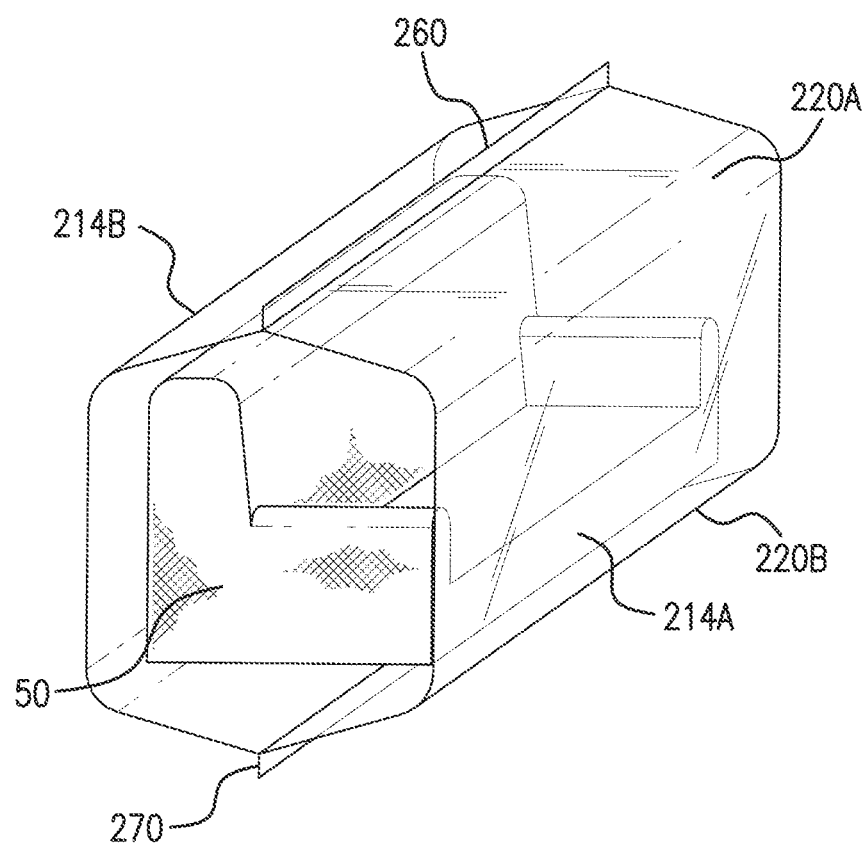
FIG. 7 is a side schematic view of a wrapped furniture article in accordance with various embodiments of the present disclosure.

FIG. 7 is a side schematic view of a wrapped furniture article having upper and lower longitudinal seals 260 and 270, respectively. This wrapping operation is shown without end seals 116 and 118 although it is appreciated that end sealer 140 can be used in conjunction with and is shown with the longitudinal sealers 145 and 147. FIG. 7 also shows some of the folds created by the gussets of the film 214 when applied over the furniture article.

As discussed herein, any furniture article 50 may be wrapped by the system provided once the system is appropriately sized to the furniture article 50. Such furniture articles may include, by way of example, couches, chairs, cabinets, tables, benches, bedframes, or similar structures.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

What is claimed is:

1. A supply web of material, comprising:
    a film layer; and
    a foam layer overlaying the film layer;
    wherein the material includes a first gusset comprising:
        a first longitudinal fold, and
        a second longitudinal fold parallel to, and folded in an opposite direction from, the first longitudinal fold, wherein opposing ends of the material face outwardly relative to the supply web.

2. The supply web of material of claim 1, wherein opposing ends of the material are spaced apart from each other.

3. The supply web of material of claim 1, wherein opposing ends of the material face away from each other.

4. The supply web of material of claim 1, wherein:
    the supply web of material is rolled to form a roll of web material; and
    the first and second longitudinal folds wrap circumferentially around the roll.

5. The supply web of material of claim 4, wherein the first gusset is disposed radially outwardly from the roll as the material is rolled.

6. The supply web of material of claim 1, wherein the film layer and the foam layer are attached to one another at laterally opposing ends of the material.

7. The supply web of material of claim 1, wherein the film layer and the foam layer are attached to one another with a pattern of seals disposed near one or more longitudinal edges of the foam layer.

8. The supply web of material of claim 1, wherein the foam layer and the film layer are detached from each other in an unsealed area disposed between the longitudinal edges such that the film layer is able to slide with respect to the foam layer in the unsealed area.

9. The supply web of material of claim 1, wherein the film layer is laterally wider than the foam layer.

10. The supply web of material of claim 1, wherein the film layer and the foam layer each comprise a polymer material.

11. The supply web of material of claim 10, wherein the film layer comprises a high-density polyethylene (HDPE) and the foam layer comprises a low-density polyethylene (LDPE).

12. The supply web of material of claim 1, further comprising a second gusset, the second gusset comprising:
    a third longitudinal fold; and
    a fourth longitudinal fold parallel to, and folded in an opposite direction from, the third longitudinal fold.

13. The supply web of material of claim 12, wherein the first gusset and the second gusset have a similar width.

14. The supply web of material of claim 12, further comprising:
    a first transverse distance between the first longitudinal fold and the third longitudinal fold; and
    a second transverse distance between the second longitudinal fold and the fourth longitudinal fold, wherein the first transverse distance is less than the second transverse distance.

15. A furniture wrapping system, comprising:
    a conveyor mechanism configured to move a furniture article along a path;

the supply web of material as defined in claim 1, wherein the supply web of material crosses the path of the furniture article to provide a film barrier across the path; and wherein the conveyor mechanism is further configured to move the furniture article into the film barrier, causing the first gusset of the supply web of material to unfold as the furniture article intersects the film barrier and causing the unfolded web material to at least partially enclose the furniture article.

16. The furniture wrapping system of claim 15, further comprising a first longitudinal sealer configured to form a first longitudinal seal to further enclose the furniture article.

17. The furniture wrapping system of claim 16, wherein:
a portion of the conveyor mechanism comprises a first conveyor portion and a second conveyor portion;
the first conveyor portion and the second conveyor portion are separated by a gap; and
the first longitudinal sealer is disposed within or below the gap.

18. The furniture wrapping system of claim 16, further comprising a second longitudinal sealer configured to form a second longitudinal seal to further enclose the furniture article, wherein the first and second longitudinal sealers are configured to form longitudinal seals above and below the furniture article.

19. The furniture wrapping system of claim 15, wherein the supply web of material is fanfolded into a fanfold configuration.

20. The furniture wrapping system of claim 15, wherein the supply web of material is rolled into a rolled configuration.

21. The furniture wrapping system of claim 15, wherein:
the supply web of material comprises a first supply of first web material and a second supply of second web material; and
the furniture wrapping system further comprises a transverse sealing mechanism configured to seal the first web material to the second web material to form the film barrier across the path.

22. The furniture wrapping system of claim 21, wherein:
the first supply and the second supply comprise a fanfold supply or a roll supply.

23. The furniture wrapping system of claim 21, wherein the transverse sealing mechanism is movable to extend at least partially across the path to seal the first web material to the second web material.

* * * * *